United States Patent [19]

Broyles et al.

[11] 4,032,888
[45] June 28, 1977

[54] NONLINEAR SCAN DRIVE READER WITH VARIABLE CLOCK CORRECTION

[75] Inventors: Douglas Wright Broyles, San Jose; Troy Cecil Stark, Campbell, both of Calif.

[73] Assignee: The Singer Company, Binghamton, N.Y.

[22] Filed: Dec. 15, 1975

[21] Appl. No.: 640,362

[52] U.S. Cl. ................. 340/146.3 F; 340/146.3 H; 358/208; 358/285; 358/263
[51] Int. Cl.² ........................................ G06K 9/00
[58] Field of Search ............ 340/146.3 F, 146.3 H; 178/7.6; 350/6, 7

[56] References Cited

UNITED STATES PATENTS

| | | | |
|---|---|---|---|
| 3,532,408 | 10/1970 | Dostal | 178/7.6 |
| 3,541,248 | 11/1970 | Young | 178/7.6 |
| 3,584,144 | 6/1971 | Shepard et al. | 340/146.3 F |
| 3,717,772 | 2/1973 | Engman | 178/7.6 |
| 3,719,780 | 3/1973 | Gazard et al. | 178/7.6 |
| 3,835,249 | 9/1974 | Dattilo et al. | 178/7.6 |
| 3,848,087 | 11/1974 | Carrell | 178/7.6 |
| 3,883,737 | 5/1975 | Throssell et al. | 340/146.3 F |
| 3,893,079 | 7/1975 | Shepard et al. | 340/146.3 F |
| 3,953,859 | 4/1976 | Locke | 178/7.6 |

*Primary Examiner*—Leo H. Boudreau
*Attorney, Agent, or Firm*—Paul Hentzel; James C. Kesterson

[57] ABSTRACT

A mirror driven by a resonant mechanical oscillator is used to scan a laser beam across a document. The incident laser beam line scans the record and is absorbed or reflected depending upon the presence or absence of an image on the record. The reflected intensity modulated light is detected by photomultiplier tubes which provide a video analog signal. An A/D device digitizes the analog signal forming a DATA OUT signal. The laser beam scan velocity across the document varies sinusoidally because of the resonant nature of the drive system. The data flow, or bit density of DATA OUT, has a corresponding sinusoidal variation. A write rate controller provides a variable clock which accompanies the DATA OUT. The variable clock has a periodic variation which matches the scan velocity. The rate of the variable clock matches the bit density of DATA OUT causing DATA OUT to be entered into a data bank properly notwithstanding its nonuniform bit density.

15 Claims, 5 Drawing Figures

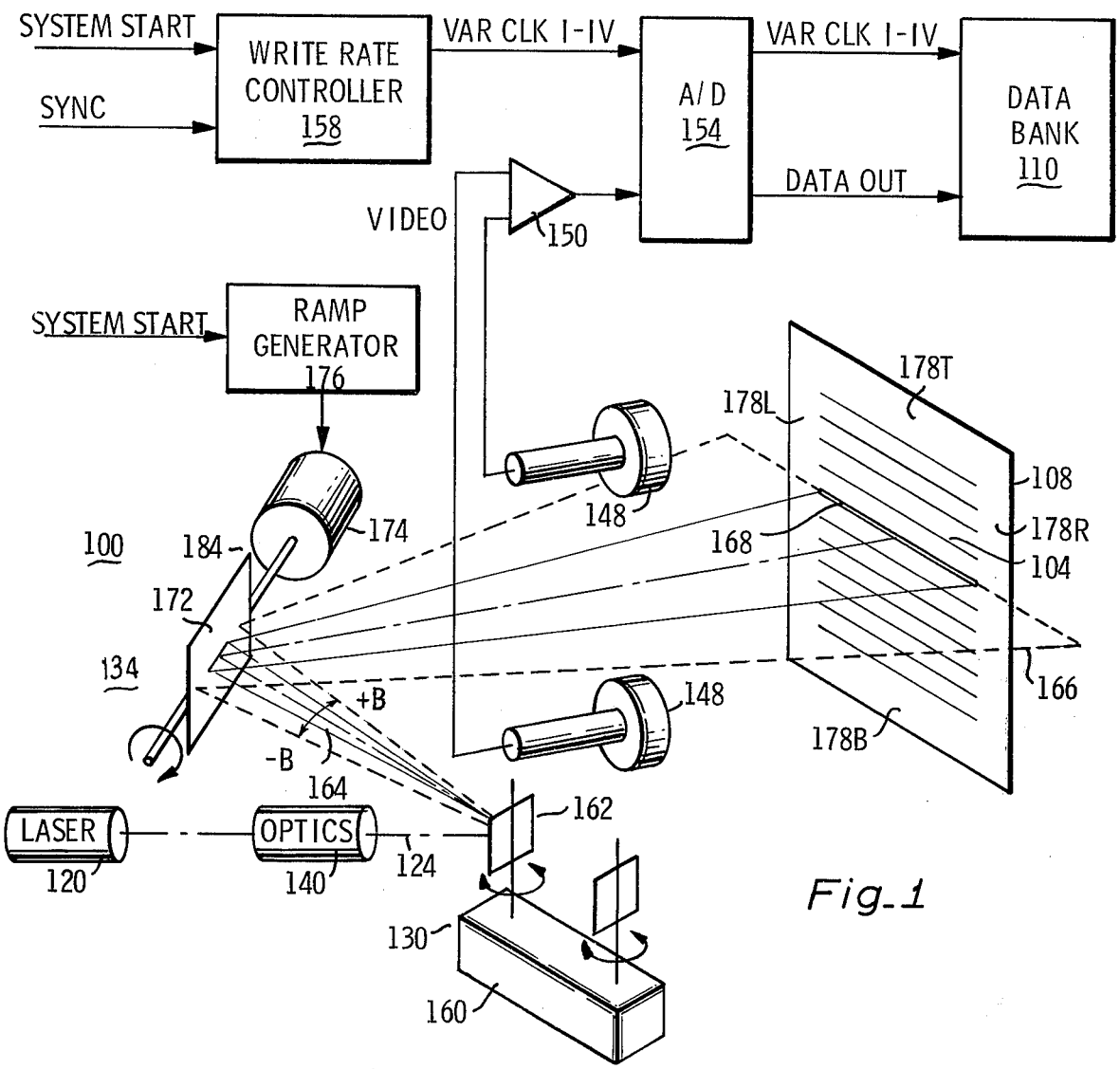
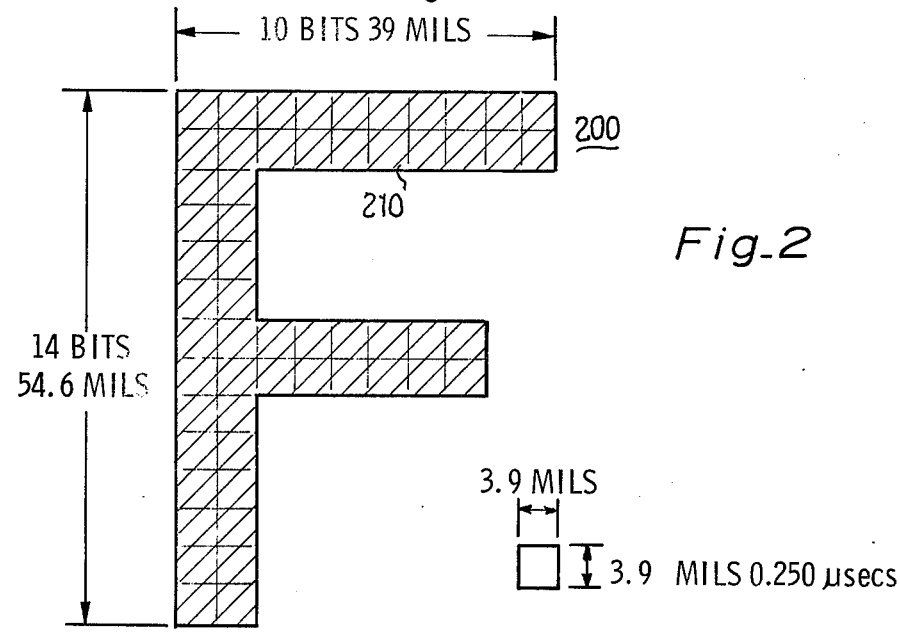
Fig.1
Fig.2

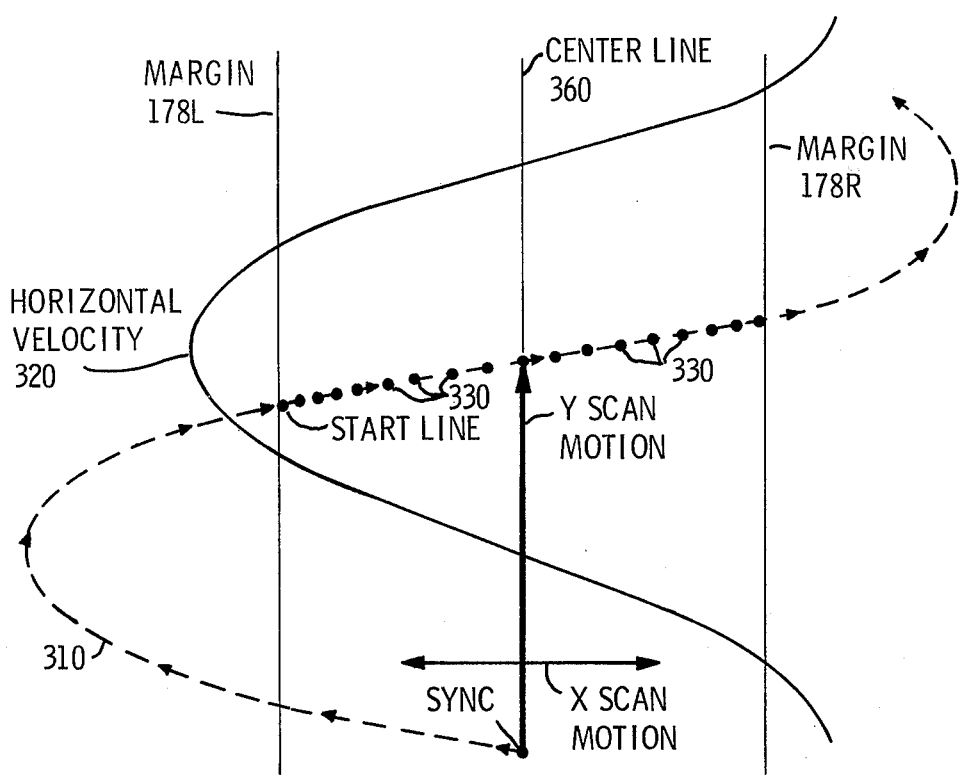
Fig_3
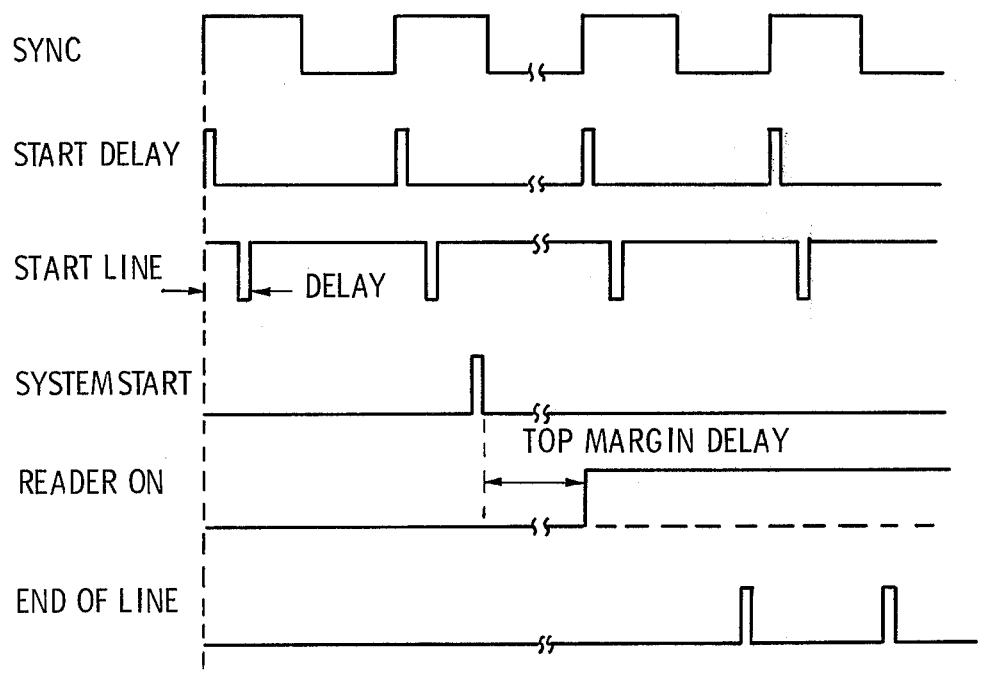
Fig_5

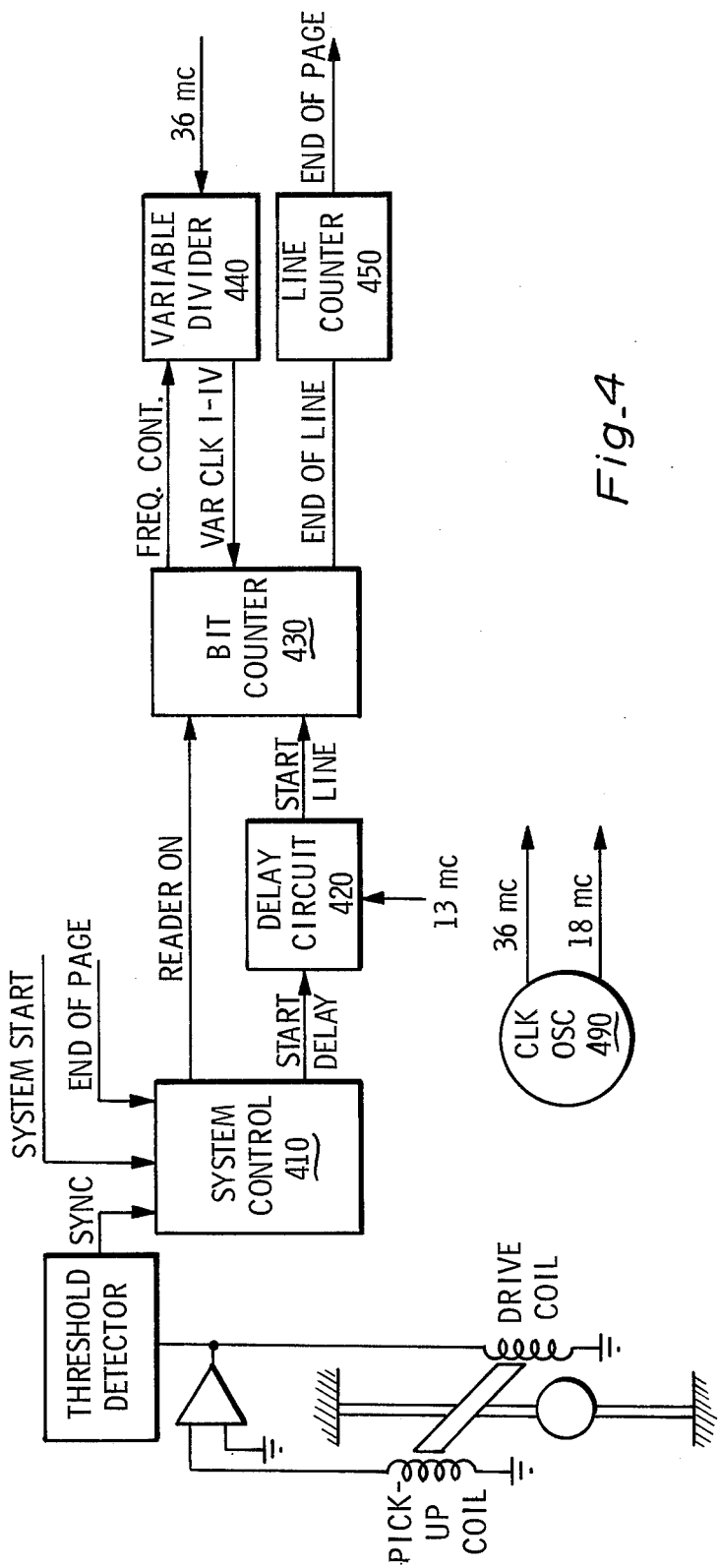
Fig_4

NONLINEAR SCAN DRIVE READER WITH VARIABLE CLOCK CORRECTION

BACKGROUND OF THE INVENTION

1. Field of the Invention

This invention relates to readers with nonlinear scanning systems which produce a nonlinear bit density output, and more particularly to such readers having a complementary nonlinear clock which accompanies the output and compensates for the nonlinearity.

2. Description of the Invention

Heretofore, sinusoidal variations in mechanical oscillator scanning rates have been avoided by using a multifacet rotating mirror or prism with a constant speed drive. The incredible machine tolerance in grinding and polishing each of the facets creates a huge cost barrier. The constant speed drive requirement is a heavy maintenance burden.

SUMMARY OF THE INVENTION

It is therefore an object of this invention to provide:

digital reader with a nonlinear clock which compensates for the nonlinear bit density of the reader output;

the above reader employing a nonlinear scan line drive motion;

the above reader employing a sinusoidal oscillator with a stable natural frequency of resonance;

the above reader employing a simple maintenance-free mechanical oscillator;

a scan line reader having a nonlinear scan velocity and a matching nonlinear data flow rate.

BRIEF DESCRIPTION OF THE DRAWING

Further objects and advantages of the present reader and the generation of the variable clock will become apparent to those skilled in the art from the following detailed description taken in conjunction with the drawings in which:

FIG. 1 is a block diagram of reader 100;

FIG. 2 is a representation of a typical alpha-numeric character 200 read by scanner reader 100;

FIG. 3 illustrates trace path 310 of beam 124 showing the nonlinearity introduced by the sinusoidal motion of mechanical oscillator 160;

FIG. 4 shows a block diagram of write rate controller 158 of FIG. 1 which compensates for the spacing nonlinearities of FIG. 3; and FIG. 5 is a timing diagram of the control signals for controller 158.

THE SCANNER-READER SYSTEM

FIG. 1 shows scanner-reader 100 which scans image 104 on a record medium such as a document 108 to provide DATA OUT to a data bank 110. A light source such as laser 120 provides a light beam 124 which is scanned across document 108 by a fast horizontal or line scanner device 130 in cooperation with slower vertical or page scanning device 134. An optical device 140 columnates and focuses beam 124 into a clear, small reading spot which is scanned across image 104. The light from the reading spot is reflected or absorbed by image 104 and document 108. The reflected portion is intensity-modulated in accordance with image 104. Light sensing devices such as photomultipliers 148 detect the reflected light and provide video analog signals representative of image 104. The video signals are combined by amplifier 150 and digitized by A/D device 154 to form digital DATA OUT. DATA OUT has a nonlinear bit density due to nonlinearities in the horizontal scan velocity of beam 124. A nonlinear variable clock signal (VAR CLK) generated by write rate controller 158 accompanies DATA OUT. The nonlinearities of VAR CLK match the nonlinear bit density of DATA OUT, and DATA OUT is clocked into data bank 110 properly on a bit-per-clock basis.

The nonlinearity of the scanning velocity originates in line scanner 130, which is preferably a mechanical oscillator 160 of the torsion bar type with electromagnetic drive and pickup, having a stable natural resonant frequency. Mechanical oscillator 160 drives a pivoting light-directing device such as mirror 162 which is mounted on the torsion bar and reflects the focused beam 124 across a deflection angle 164 (in dash) causing the writing dot to scan back and forth in the X direction across document 108 along trade line 166 (in dash). The angular displacement of mirror 162 varies sinusoidally due to the resonant nature of mechanical oscillator 160. Mirror 162 has a slower angular velocity towards the end portion of displacement 164 and a faster angular velocity during the middle portion. These nonlinearities produce corresponding nonlinearities in the scanning velocity. Scan line 168 is the most linear central portion of trace 166 and is the most suitable for reading.

Page scanning device 134 is a light-deflecting device such as mirror 172 mounted on the armature of a galvo motor 174. A linearly increasing voltage from ramp generator 176 causes galvo motor 174 to rotate slowly and linearly. Mirror 172 tilts slowly moving beam 124 along the Y direction of document 108. The minimum ramp voltage defines top margin 178T and the maximum ramp voltage defines bottom margin 178B. Scan line 168 moves slowly down document 108 defining a left-hand reading margin 178L and a right-hand reading margin 178R.

IMAGE QUALITY

FIG. 2 shows a typical alpha-numeric symbol 200 divided into square elements 210 or bits by the horizontal and vertical scanning of devices 130 and 134, and the clocking by VAR CLK. Each bit of DATA OUT corresponds to one element 210. Symbol 200 is reformed when elements 210 are recombined from data bank 110 through an appropriate scanner printing device. The conventional letter size of four points in the 14×10 element format of FIG. 2 requires 2176 data bits in each 8½ inch scan line, about 3.9 mils per bit. Seven such scan lines are required to digitize a single line of alpha-numeric symbols. Mirror 162 oscillates at 400 cps making one complete back and forth scan in 2.500 milliseconds. Only the most linear 43 percent of trace line 166 is actually employed in scan line 188 for reading. The actual reading time required for a single 8¼ inch scan in one direction is about 544 microseconds. Therefore, in the FIG. 2 instance, each of the 2177 bits must be read within 0.250 microseconds in a 3.9×3.9 mil space with a deviation error undetectable by the unaided eye. The reading samples of scanner reader 100 taken from memory bank 110 were surprisingly crisp and linear in view of these stringent requirements.

The crispness of the image produced by writing from data bank 110 is determined by the mechanical precision of reader 100 and by the definition of the reading spot. Optics 140 may provide columnating apertures for eliminating spurious or fringe light. Fuzzy edges around the reading spot may also be reduced by providing a mirror 162 which is smaller in area than the cross-section of beam 124. This mirror clips the beam just prior to reading, eliminating the peripheral light which is the primary source of edge noise and resolution loss. Reducing the mirror size has the added advantage of increasing the oscillation frequency because of the lower angular inertia. A concave clipping mirror may provide the desired focus as well as columnation to reduce the complexity of optics 140. The mirror may be twin-mounted on the double torsion bar geometry shown in FIG. 1 which provide counteractive torques for reducing resonant vibrations throughout mechanical oscillator 160. In order to reduce swaying, the torsion bar may be secured at both ends as shown in FIG. 4.

VARIABLE CLOCK TO MATCH SCANNING VELOCITY VARIATIONS

FIG. 3 shows the sine trace path 310 of scanning beam on across document 108. The Y scan motion in FIG. 3 has been exaggerated relative to the X scan motion to emphasize the sinusoidal nature of the beam trade line. The horizontal and vertical positions of beam 124 are given by horizontal position = X = A sine KB vertical position = Y = (Y scan velocity) (time)

where A is the amplitude of deflection, B is one-half of the instantaneous deflection angle 164, and K is a normalizing constant = 90°/Bmax.

The horizontal component of the velocity of beam 124 is horizontal velocity = $X' = d$(A sine KB)dt = $A$ cosine KB The horizontal velocity (bold line 320) is not constant and reads uniformly spaced data at a nonlinear rate (shown by dots 330). Dots 330 correspond to the position of beam 124 after equal time periods and illustrates the nonlinear nature of the X scan motion. The reading begins at the left-hand margin 178L of document 108 and terminates at the right-hand margin 178R. The function of write rate controller 158 is to provide a variable clock (VAR CLK) which adjusts the flow rate of DATA OUT to match the nonlinear horizontal scan velocity of beam 124. VAR CLK increases in frequency as beam 124 increases in velocity from left-hand margin 178L to center scan 360, and VAR CLK decreases in frequency as beam 124 decreases in velocity between center scan 360 and right-hand margin 178R. VAR CLK frequency (the velocity of DATA OUT) closely matches the periodic variations in the scan velocity so that samples of DATA OUT printed from data bank 110 do not have visible nonlinearities in the picture element distribution along the scan lines.

Many possibilities exist for providing a variable clock to synchronize the clock accompanying DATA OUT with the X scanning velocity. A cosine control signal could be provided to control the clock rate of controller 158 in analog fashion. Alternatively, the digital technique described in FIGS. 4 and 5 may be employed. Multiple clock rates are generated and selectively forwarded to data bank 110 during different segments of the sinusoidal scan cycle. The slowest clock is applied during the first or left-hand segment of scan line 168. Subsequent clocks increase in frequency to match the increase in scan velocity, and increase in duration of application because scan line 168 becomes progressively more linear as the writing dot approaches center line 360. The clocks are then applied in reverse order for the right-hand side of scan line 168 concluding with the lowest frequency clock at right-hand margin 178R.

In the FIG. 4 embodiment scan line 168 is divided into eight segments requiring four separate clock frequencies as follows:

| | Start Clock | Stop Clock | Number of Bits | Frequency |
| --- | --- | --- | --- | --- |
| Clock I | 0 | 64 | 64 | 3.000 mc |
| Clock II | 65 | 320 | 256 | 3.270 mc |
| Clock III | 321 | 576 | 256 | 3.600 mc |
| Clock IV | 577 | 1088 | 512 | 4.000 mc |
| Clock IV | 1089 | 1600 | 512 | — |
| Clock III | 1601 | 1856 | 256 | — |
| Clock II | 1857 | 2112 | 256 | — |
| Clock I | 2113 | 2176 | 64 | — |

In applications requiring finer control, more segments and clock frequencies may be employed.

WRITE RATE CONTROLLER

FIG. 4 shows write rate controller 158 and mechanical oscillator 160 in more detail. A SYSTEM START pulse from an operator or external control starts system control 410 and ramp generator 176. System control 410 provides control signals to various other blocks of write rate controller 158 for coordinating the operation thereof (see FIG. 5). Mechanical oscillator 160 continually provides a SYNC pulse at X=0 each cycle to system control 410. System control 410 responds to SYNC by issuing START DELAY. START DELAY activates delay circuit 420 which, after a predetermined delay period, in turn activates a bit counter 430 by a START LINE voltage. The delay period permits the reading spot to move from X=0 to left-hand margin 166L, the start of scan line 156. Bit counter also identifies the beginning and ending of each of the eight scan line segments and determines the four clock frequencies by means of FREQ CONT I-IV applied to variable divider 440 which divides 36 mc by 9, 10, 11, or 12 in response to FREQ CONT I-IV to obtain VAR CLK I-IV which advances bit counter 430.

READER ON is issued from system control 410 to bit counter 430 after top margin 178T has been established. READER ON causes bit counter 430 to provide END OF LINE to line counter 450 at the end of each scan line 156. Line counter 450 counts one page of scan lines - 1408 - and generates END OF PAGE which stops system control 410, and indicates the beginning of bottom margin 178B to the external operator or control computer. READER ON also forwards VAR CLK to A/D 154. clock oscillator 490 provides mc signal and multiples hereof for timing the operation of controller 158.

DETAILED DESCRIPTION OF THE PREFERRED EMBODIMENT

Data bank 110 may be a high-speed memory system in which a solid state memory buffer interfaces with magnetic storage.

Laser 120 may be a 5-20 milliwatt argon laser, Model 162, from Spectra Physics. Light from laser 120 has twin wavelengths at green (488.0 nm) and blue (514.5 nm) which increases the reading fidelity.

Optics 140 may be a beam expander type optical system from Oriel Co., Model No. B-33-60, for focusing laser beam 124 onto document 108, with an aperture for defining the diameter of the reading spot.

Photomultiplier tubes 148 may be any photomultiplier responsive to the two wavelengths of laser 120 such as RCA-4523.

Video amplifier 150 may be any wide band video amplifier such as LM 318 from National.

A/D 154 may be a
 a. voltage threshold detector formed by an LM 306 from National for squaring the video analog signal from photomultipliers 148; and
 b. coincidence device such a D flip flop (7474) for establishing a time base for DATA OUT.

Ramp galvo motor 174 may be any suitable rotating device such as Optical Scanner, Model No. G330 from General Scanning.

Ramp generator 176 may be any suitable generator which can provide a linear ramp from 0–5 dc.

Delay circuit 420 is a 12-bit counter clocked by 18 mc formed by three 4-bit counters (SN 9316) in cascade. The delay accommodates the time elapsing between SYNC (when galvo is at $X=0$) and START LINE (when the scanning beam is at the left-hand margin 178L of the scan line 168). START DELAY presets a control flip flop (SN 74S74) which starts the 12-bit counter, and START LINE resets the control flip flop.

Bit counter 430 may be a 12- bit counter formed by three 4-bit modular counter (SN 9316) in cascade for counting the 2176 bits of each scan line 168. Bit counter 430 also includes an 8×32 PROM (8223) responsive to six counts which determine the boundaries of the eight segments (counts 64, 320, 576, 1600, 1856, and 2112). The PROM provides three binary bits of control frequency data to variable divider 440.

Variable divider 440 may be a programmable counter (9316) and an inverter (7404) connected in feedback configuration which are responsive to the three bits of control frequency data for dividing a 36 mc clocking signal by 9, 10, 11, and 12 to provide VAR CLK I-IV.

Line counter 450 may be a 12-bit counter formed by three 4-bit counters (SN 9316) in cascade for counting the 2816 scan lines in each data block or page.

Clock oscillator 490 may be an LC oscillator and frequency divider for providing squarewaves at 36 mc and 18 mc.

We claim as our invention:

1. A scanner for reading record data from a record medium by scanning the record medium with an energy beam to provide a digital data output flow with a nonlinear bit density, comprising:
 a mechanical oscillator means having a sinusoidal displacement characteristic;
 energy-directing means responsive to the sinusoidal displacement of the oscillator means for causing the energy beam to scan in a predetermined pattern across the record medium causing the energy of the beam to become modulated by the record data at a modulation density directly proportional to the scanning velocity of the energy beam;
 energy sensor means for detecting the modulated energy for providing a correspondingly modulated analog signal;
 analog to digital means responsive to the modulated analog signal for providing a correspondingly modulated digital data output flow having a flow rate directly proportional to the relative scan motion between the energy beam and the record medium; and
 controller for providing a variable clock to accompany the digital data output flow having a series of predetermined constant pulse frequencies for predetermined segments of the sinusoidal displacement for approximately matching the clock rate to the digital data output flow rate.

2. The scanner of claim 1, wherein the mechanical oscillator is a resonant device with a natural frequency of resonance.

3. The scanner of claim 2, wherein the resonant mechanical oscillator has an arcuate oscillatory displacement.

4. The scanner of claim 3, wherein the energy beam is a light beam.

5. The scanner of claim 4, wherein the energy-directing means is an optical device.

6. The scanner of claim 5, wherein the optical energy-directing device is arcuately displaced in response to the arcuate oscillatory displacement of the resonant mechanical oscillator.

7. The scanner of claim 6, wherein the resonant mechanical oscillator is a torsion bar device which supports the light-directing optical device and oscillates about its longitudinal axis.

8. The scanner of claim 7, wherein the torsion bar oscillator is electromagnetically activated by a drive coil.

9. The scanner of claim 7, wherein the arcuate displacement of torsion bar oscillator is electromagnetically monitored by a pickup coil to provide periodic synchronization signals to the controller.

10. The scanner of claim 6, wherein the resonant mechanical oscillator is formed by twin torsion devices mounted in counter-active relationship.

11. The scanner of claim 6, wherein the optical energy-directing device is transparent and refracts the incident light beam across the record medium.

12. The scanner of claim 6, wherein the optical energy-directing device has a reflective surface for reflecting the incident light beam across the record medium.

13. The scanner of claim 12, wherein the area of the reflective surface is less than the cross-section of the beam causing the beam to be clipped to the dimensions of the reflective surface.

14. The scanner of claim 2, wherein the controller provides variable clock rates for substantially matching the data output flow rate to the first derivative of the sinusoidal displacement.

15. Apparatus for reading input data at a nonlinear rate from a laser-responsive image on a record medium, and writing the data into a data bank on a bit-per-clock basis, comprising:
 a laser source means for providing a laser beam;
 a torsion oscillator for providing a resonant sinusoidal angular motion;
 a laser beam deflecting means responsive to the sinusoidal angular motion for causing the modulated laser beam to scan the record medium periodically along a scan line during the most linear portion of the sinusoidal angular motion when the velocity of the scanning laser beam is subject to the least amount of variation;
 drive means for establishing relative motion between the laser beam and the record medium generally traversely to the scan line for permitting the laser beam to scan the image which causes the energy of the laser beam to become modulated by the input data therein;

photo-sensing devices for detecting the modulated energy and provide an input data modulated video analog signal;

a threshold detector for digitizing the video analog signal forming an output digital flow with a bit density which varies as the velocity of the scanning laser beam; and a clock means responsive to the torsion oscillator for providing a variable clock formed by a series of predetermined constant clock rates each generated during a predetermined segment of the sinusoidal angular motion, and having a frequency approximating the bit density of the output digital flow.

* * * * *